Oct. 18, 1927.

F. B. ROBERTS

1,646,067

STACKING AND CONVEYING MECHANISM

Filed May 14, 1925    5 Sheets-Sheet 1

INVENTOR
FRANK B. ROBERTS

ATTORNEY.

Oct. 18, 1927.

F. B. ROBERTS

1,646,067

STACKING AND CONVEYING MECHANISM

Filed May 14, 1925     5 Sheets-Sheet 2

INVENTOR.
FRANK B. ROBERTS
BY B. J. Craig
ATTORNEY.

Patented Oct. 18, 1927.

1,646,067

UNITED STATES PATENT OFFICE.

FRANK B. ROBERTS, OF ANAHEIM, CALIFORNIA, ASSIGNOR OF ONE-HALF TO WILLIS G. HUNTINGTON, OF SAWTELLE, CALIFORNIA.

STACKING AND CONVEYING MECHANISM.

Application filed May 14, 1925. Serial No. 30,225.

This invention relates to means for transporting articles from one location to another.

The general object of the invention is to provide means for transporting articles from one station to another station at a different level and to simultaneously stack the articles one upon the other while being so transported and wherein novel means is provided for effective operation of the device.

A further object of the invention is to provide an improved driving mechanism for operating the moving parts of an elevating stacker.

Other objects of the invention will be apparent from the following description taken in connection with the accompanying drawings wherein Fig. 6 is a perspective view showing the rewind control device.

Referring to the drawing by reference characters, I have shown vertical supporting standards 10 for a machine embodying the features of my invention. At 11 horizontal supporting members are shown.

Mounted upon the horizontal members 11, I show a pulley 12 which is adapted to receive and operate a belt or other continuous conveyer 14.

Mounted upon the horizontal members 11, I show a pair of rollers 15 and 16 (see Fig. 1) and adjacent these rollers 15 and 16 are a pair of spaced rollers 17 (Fig. 3) which are arranged on the same shaft. These rollers 15, 16, and 17 serve to convey boxes or other material from the conveyer 14 to the elevating or lowering mechanism to be presently described.

It may be here stated that my device is primarily intended for stacking articles such as orange boxes, one upon the other, after which the stacked articles may be conveyed away from the elevator. The invention herein described is an improvement on the invention described in my copending application Serial Number 667,909 filed October 11, 1923. In the following description and claims, I refer to a certain embodiment of my invention but I wish it to be understood that this is merely illustrative of my invention and that other constructions may be made without departing from the scope of the appended claims.

In order to provide a prime mover for operating my device, I show a motor 20 arranged adjacent the lower end of the standards 10. This motor is connected by means of a belt 21 with a drive shaft 22. The drive shaft 22 has a pair of pulleys 23 and 24 fixed thereon.

The pulley 23 through a belt 23′ drives a pulley 25 fixed on a shaft 26 while the pulley 24 through a belt 27 drives a pulley 28 on a shaft 29.

The shaft 26 has a second pulley 30 arranged thereon and this pulley 30 receives a quarter turn belt 31 which engages a pulley 32 fixed on a shaft 35 which is arranged at right angles to the shaft 26. The rollers 17 previously described are mounted on the shaft 35 and it will be apparent from the foregoing description that when the motor 20 is operated the rollers 17 will turn.

Fixed on the shaft 35 I arrange a sprocket 36 over which a chain 37 is fitted. The chain 37 passes over a sprocket 38 fixed on a shaft 39 on the roller 15. The construction is such that when the roller 17 rotates, the roller 15 also rotates.

In order to provide an intermittent drive for the pulley 12 to thus cause intermittent travel of the conveyer belt 14, I secure a pulley 40 upon the shaft 35. The pulley 40 receives a belt 41 which engages a pulley 42 mounted upon a shaft 43. The shaft 43 has a sprocket 44 fixed thereon, which through a chain 45 drives a sprocket 46 fixed on the shaft 47 on which the pulley 12 is mounted.

Figures 1, 8:
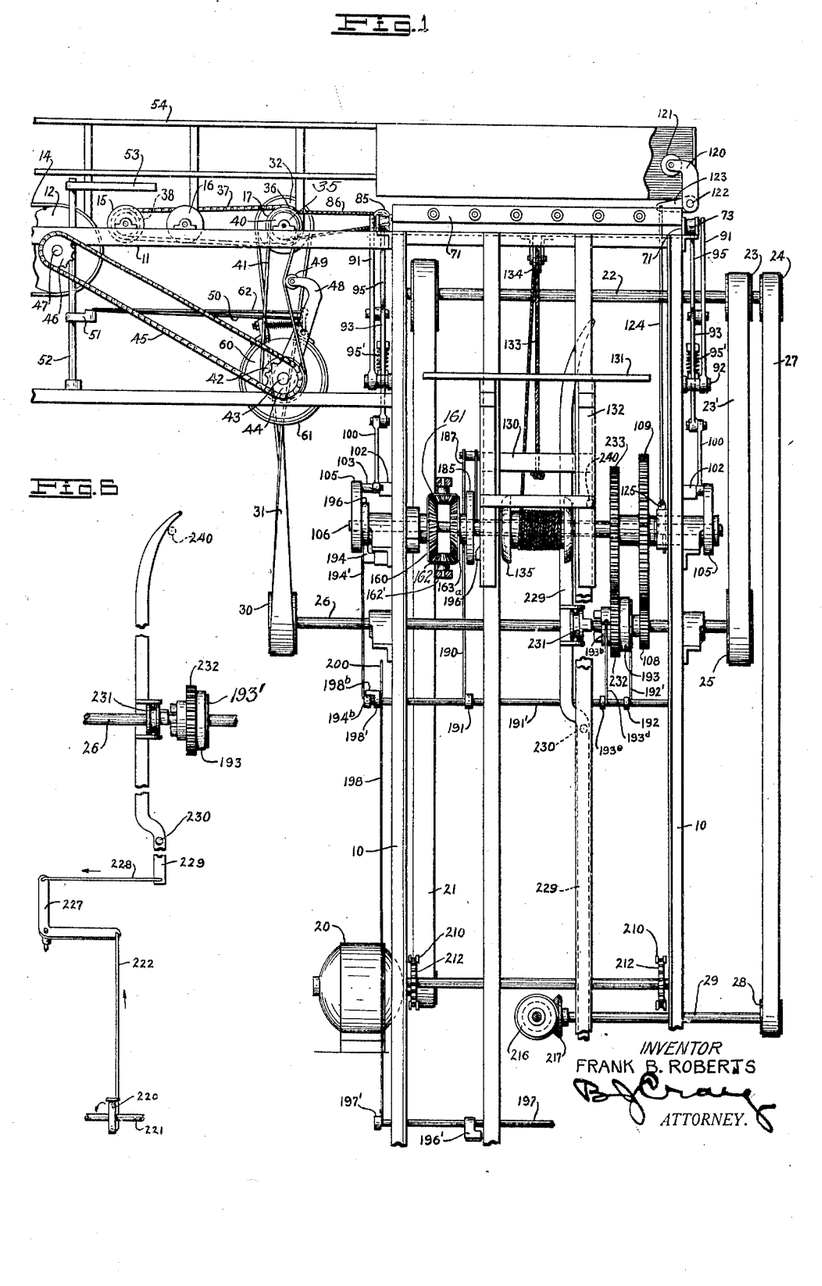
Fig. 1 is a front elevation showing a portion of a machine embodying the features of my invention.
Fig. 8 is a sectional view showing one of the clutches.

In order to provide the before mentioned intermittent drive from the pulley 40 to the pulley 42, I show the belt 41 as loosely arranged upon the pulleys 40 and 42 and as adapted to be tightened by a belt tightener 48 including an idle roll 49 (see Fig. 1). The belt tightener is loosely pivoted on the shaft 43 and is adapted to be rocked to tighten the belt by a pull exerted upon a link 50 which is connected to a crank 51 fixed on a shaft 52.

The shaft 52 has an operating lever 53 thereon which is adapted to be engaged by boxes resting on the roller 16. The device shown in the drawings is provided with guides 54 at each side which prevent lateral movement of the boxes passing from the conveyer 14 to the rollers 15, 16, and 17.

The shaft 43 is provided with a brake drum 60 thereon which in turn is provided with a brake band 61. The brake band 61 is adapted to be controlled by a rod 62 which like the link 50 is arranged on the crank 51.

Figures 3, 4:
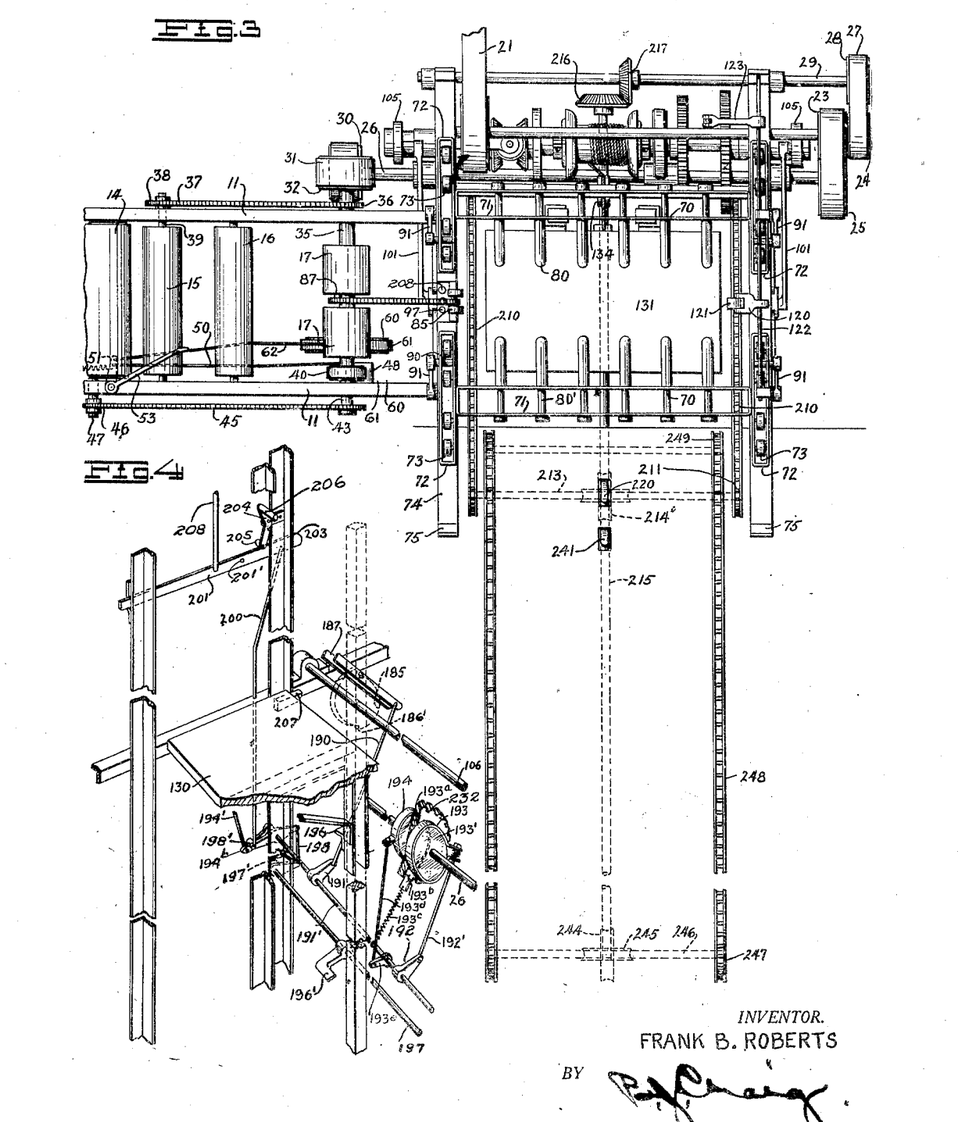
Fig. 3 is a top plan view of the machine.
Fig. 4 is a fragmentary view, in perspective, showing part of the control mechanism for the elevator.
Figure 7:
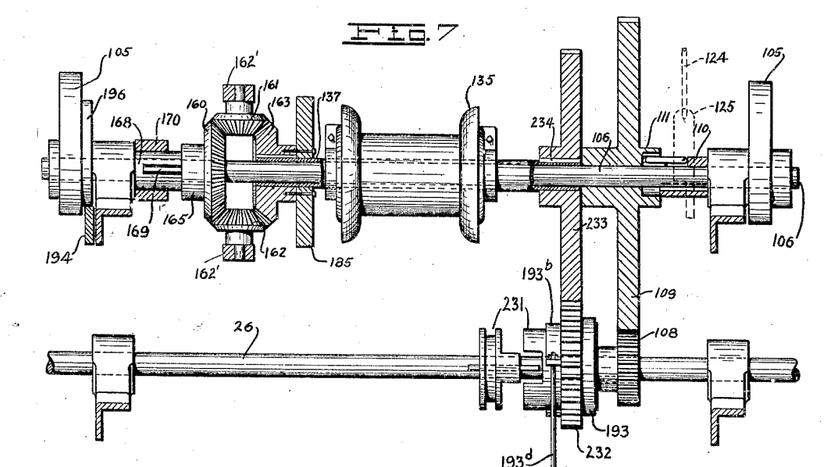
Fig. 7 is an elevation, partly in section, showing the main drive assembly.
Figure 8:
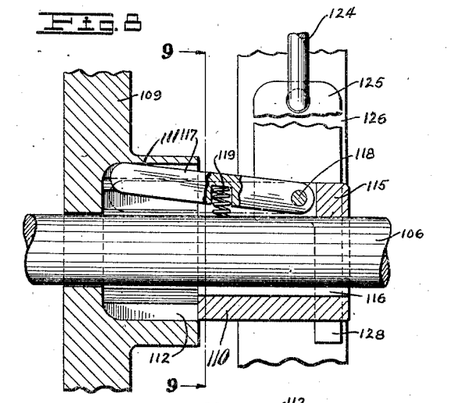

From the foregoing description it will be apparent that when the motor is operating, the rollers 15 and 17 will be in motion and the arm 53 will be in the position shown in Fig. 3 so that the belt tightener 48 engages the belt 41 thus tightening the belt and releasing the brake and causing rotation of the shaft 43 and rotation of the pulley 12 thus actuating the conveyer 14 and delivering a box to the roll 15. As soon as the box engages the arm 53 and rocks it, this arm, through the link 50 and the rod 62, causes a loosening of the belt 41 and applies the brake to stop the conveyer 14.

The delivery or stacking mechanism as shown in the drawings comprises a pair of horizontally movable gates 70.

Each of the gates comprises a frame 71 and at the end of each frame I show supporting frames 72. The supporting frames are provided with spaced rollers 73 best shown in Fig. 3. The rollers 73 are supported on tracks 74, which are provided with stop members 75 at each end thereof.

Each of the frames 71 of the gates is provided with a plurality of rollers 80 which are mounted in the opposite sides of the frame 71. Each roller is provided with a box engaging portion and a reduced portion 80'. Bushings 80'' are fitted upon the reduced portion in such manner that they turn in apertures in the frame 71. Split washers 81 fit peripheral grooves in the bushings 80'' to hold the bushings in place and allow free rotation of the rollers 80.

When a box is advanced from the rollers 17 to the gates 70 the box will engage the rollers 80 and will then move quickly to position upon the gates. In order to advance the box after it leaves the rollers 17, I show a pair of auxiliary rollers 85 which are disposed adjacent one end of the gates 70. These auxiliary rollers 85 are shown as driven by a chain 86 which passes over a sprocket 87 arranged on the shaft 35 between the rollers 17.

The gate supporting frames 72 are provided at each end thereof with pins 90 which engage in elongated slots in arms 91 pivotally connected to the standards 10 at 92. The arms 91 (see Fig. 2) one of which is arranged at each end of each frame 72, are adapted to be rocked by means of links 93 which are pivoted to the arms 91 at one of their ends and are pivoted at their other end to blocks 94 slidable on operating members 95 which are actuated by means presently to be described.

The operating members 95 are each provided with a lock nut 96 which engages the block 94 when the member 95 moves upwardly. A second block 94' is adjustably held by a set screw 94ᵇ pinned to the member 95 in spaced relation to the block 94 and a spring 95' normally maintains the two blocks separated. Should a box accidently remain between the ends of the rollers 80, a downward movement of the members 95 would merely compress the spring 95' and hence avoid damage to the machine or the box.

Figures 2, 5, 11, 16:
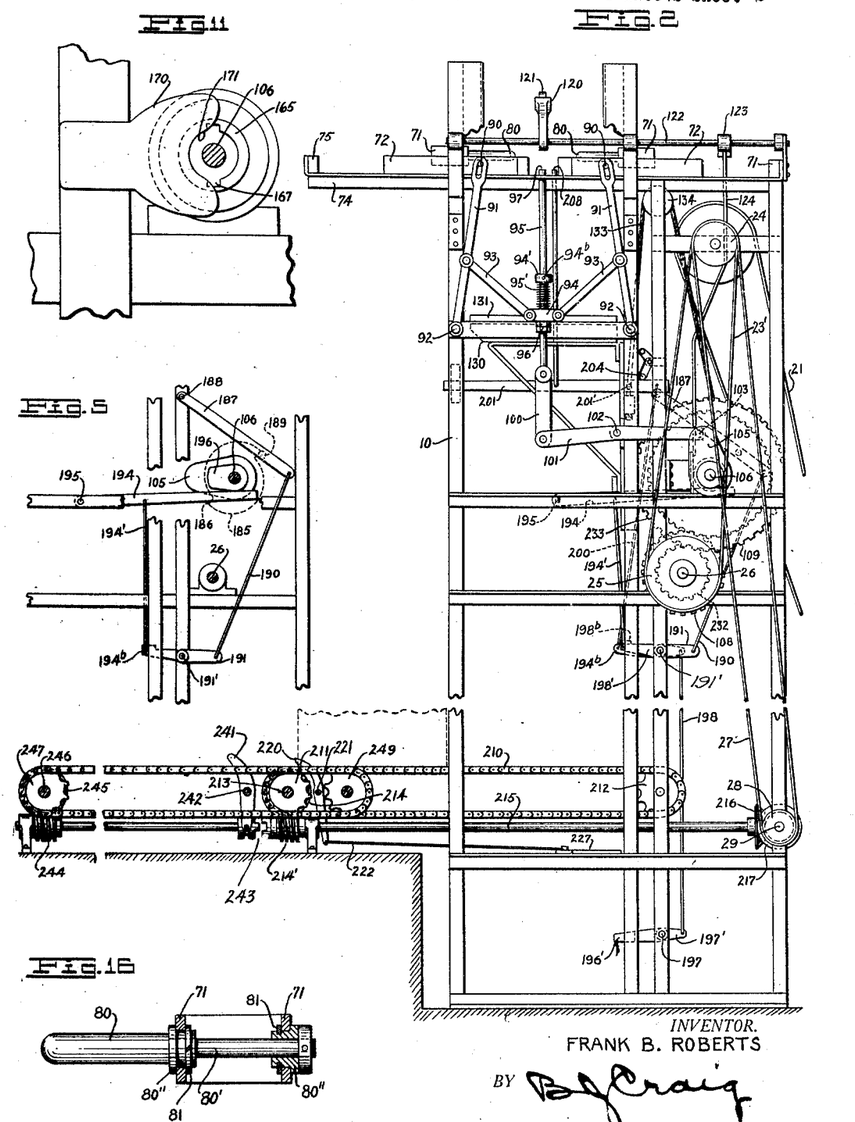
Fig. 2 is an elevation similar to Fig. 1 but taken at right angles thereto.
Fig. 5 is a fragmentary elevation showing details of the control mechanism.
Fig. 11 is an elevation showing the drum driving bevel gear.
Fig. 15 is an elevational detail of a cam and Fig. 16 is a section partly in elevation showing a roller.

One of the operating members 95 as shown in Fig. 2, extends above the track 74 and when the operating member 95 moves upwardly to open the gates, the end 97 of this operating member is projected into the entrance way to the gates 70 to thus prevent entry of a box upon the gates while the latter are in their outer position.

In order to actuate the operating members 95, I connect these members through a link 100 with a lever 101 which is pivotally mounted at 102 on the frame. One end of the lever 101 is provided with a pin 103 which fits within a cam slot 104 arranged on a cam member 105. It will be understood that there are two of the operating members 95 and associated parts and that there are two of the cam members 105.

The cams 105 are fixed on a shaft 106. This shaft 106 is adapted to be driven from the continuously rotating shaft 26 previously described, through gears 108 and 109 as will be described. The gear 108 is keyed on the shaft 26 while the gear 109 is mounted to rotate freely about the shaft 106 and is adapted to be clutched to said shaft by means of a clutch mechanism 110.

The clutch mechanism 110 is illustrated in Figs. 7, 8, 9 and 10 where it will be noted that the gear 109 is provided with a hub 111 having a plurality of internal slots 112 therein. The coacting clutch member 115 comprises a sleeve keyed to the shaft 106 by means of a key 116. Mounted on the clutch member 115 is a dog 117 which is pivoted at 118 and which is provided with an actuating spring 119.

The locking dog 117 is so arranged that the spring 119 will normally push it into engagement in one of the slots 112 and when in this position, it will be seen that the shaft 26 will drive the gear 109 and thus rotate the shaft 106 and operate the cams 105.

In order to provide means for operating the dog 117 and thus controlling the operation of the clutch 110 I show a bell crank 120 which is pivoted adjacent the end of the gates 70. This bell crank has a roller 121 which will be engaged by a box passing upon the gates. When the box strikes the roller 121 it will rock the bell crank 120 and will rotate the shaft 122 upon which the bell crank is mounted. This shaft 122 has a lever 123 fixed thereon and this lever is in turn connected with an operating rod 124 connected to a plate 125. This plate 125 slides between the clutch member 115 and a bearing plate 126 (see Fig. 9) so that when the bell crank 120 is rocked it will lift the member 125 until this member is out of engagement with the dog 117 as it rotates on the shaft 106. The member 125 it will be noted is provided with a guide portion 128 at its lower end so that it may be held in proper position.

Figure 9:
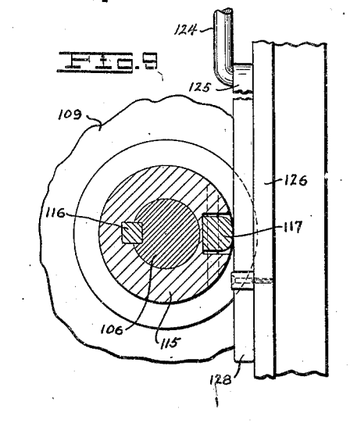
Fig. 9 is a sectional detail on line 9—9, Fig. 8, partly in elevation with the shaft turned through 90° and showing the clutch in another position.
Figure 10:
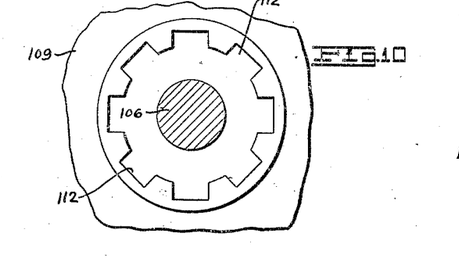
Fig. 10 is a section, partly in elevation, of a gear showing the pawl engaging slots.

From the foregoing description it will be apparent that when a box passes over the gates 70 it will rock the crank 120 thus lifting the plate 125 and allowing the dog 117 to engage the gear 109, thus causing the shaft 26 to turn the shaft 106 and rotate the cams 105 which in turn rocks the lever 101 and moves the operating rod 95 up to open the gates 70 and allow a box resting on the gates to drop on to an elevator to be presently described. As the box passes down with the elevator the roller 121 rolls along an end of the box and as soon as the top of the box has cleared the roller 121 the bell crank 120 will move to its normal position and the clutch will be thrown out of engagement by the member 125 engaging the dog 117 as shown in Fig. 9.

The elevator shown with my invention on which the boxes are adapted to be stacked comprises a frame 130 which is mounted for movement between the standards 10. The frame 130 includes an elevator platform 131 and guides 132.

Figure 12:
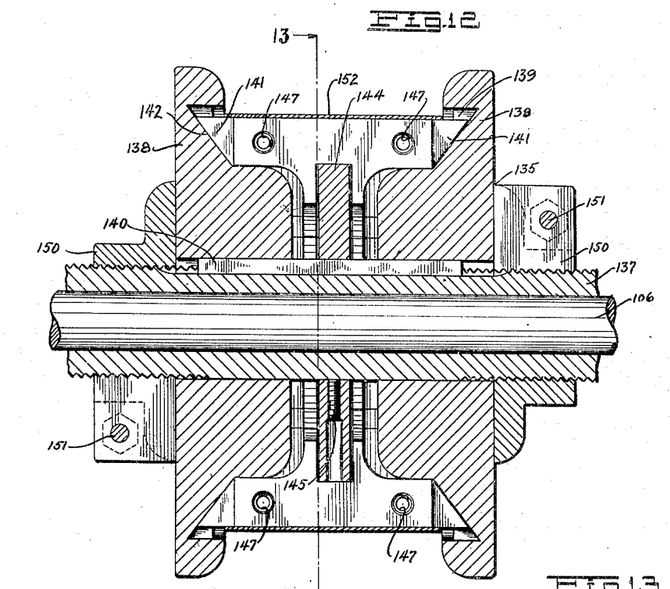
Fig. 12 is a central sectional view showing the cable drum.
Figures 13, 14, 15:
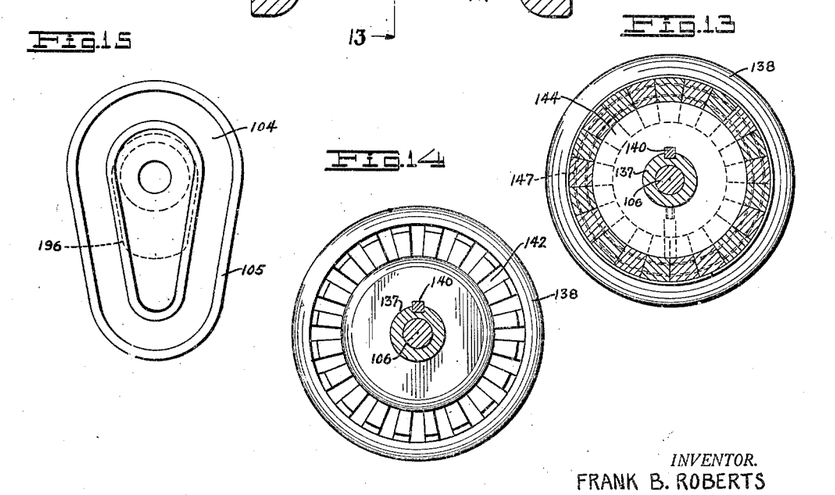
Fig. 13 is a section on line 13—13, Fig. 12.
Fig. 14 is a face view of a drum end.

The elevator is adapted to be raised and lowered by means of a cable 133 which passes over a pulley 134 arranged on the main frame. The cable passes to a cable drum 135 which is shown in detail in Fig. 12.

This drum 135 is mounted on a sleeve 137 which in turn is arranged to turn on the shaft 106. The sleeve 137 will be described later.

The drum comprises end members 138 which are provided with recesses 139 on the inner face thereof. The end members 138 are slidably secured upon the sleeve 137 on a key 140. Arranged within the recesses 139 are a plurality of rails 141. These rails 141 have the ends thereof beveled as at 142 to fit the taper of the recess 139, and the construction is such that when the end members 138 are moved toward each other the beveled ends 142 will slide along the recesses and as they slide, will move outwardly to increase the diameter of the drum.

A disc 144 is arranged upon the sleeve 137 and is adapted to be secured upon this sleeve by means of a set screw 145. This disc 144 holds the rails 141 in position and in order to further hold these rails in position, I provide a recess at each end and in the recesses I mount a spiral spring 147. In order to hold the end members 138 in adjusted position, I provide threaded collars 150 which engage the threaded sleeve 137 to hold the blocks adjusted. The collars 150 are of the split variety and are provided with threaded fastening members 151 which tightly hold them in adjusted position. A tread 152 which may be a coiled strip of metal is shown on the drum.

In order to provide means for rotating the cable drum to unwind the cable 133 and lower the elevator, I provide a bevel gear 160 which is arranged upon the shaft 106 and which is normally clutched to the shaft 106 by means to be later described. This bevel gear is arranged to drive, through gears 161 and 162, which have a yoke 162' thereon, another bevel gear 163 which is keyed on the sleeve 137 which is arranged to turn on the shaft 106 as previously described.

The drum 135 is also keyed on the sleeve 137 so that it will be apparent that when the bevel gear 160 is rotated the drum will be actuated.

In order to drive the gear 160 from the shaft 106 I provide a clutch member which is shown in Fig. 11 and which is somewhat similar in construction to the clutch member 110 previously described. The gear 160 is provided with a hub 165 which has two internal notches 167 therein. A collar 168 is keyed on the shaft 106 and this collar has a spring pressed pin 169 which normally fits in one of the slots 167. A fixed block 170 is provided with a curved face 171 which engages the pin 169 during a partial rotation of the shaft 106 to thus stop rotation of the gear 160 and drum 135 before the rod 124 releases the clutch 110. This clutch member 165 is normally in engaging position and when the clutch 110 drives the shaft 106 the clutch 165 will drive the gear 160 from this shaft and will cause the cable drum to be rotated to unwind the cable while the gates 70 are spaced apart.

As soon as the bell crank 120 assumes the normal position the stop 97 will be lowered and another box will be advanced upon the gates 70 and the operation will be repeated until a predetermined number of boxes have been arranged one upon the other. I have found that five boxes when stacked and when placed one upon the other make a convenient stack for handling, but the machine may be made to stack more or less as desired.

The sleeve 137 is also provided with a step by step control 185. This control comprises a disc secured on the gear 163 and having a pair of stepped notches 186 therein as shown in Fig. 1. In order that the elevator may be accurately positioned during each step by step movement, I show a pair of spaced arms 187 which are pivotally mounted at 188 (see Fig. 5). These arms have a locking cross member 189 thereon which engages the steps 186 on the control member 185 when the arms are in lowered position.

In order to raise the arms 187 so that the steps 186 will clear the cross member 189, I provide a link 190 which is secured to a lever at 191 secured to a shaft 191' (Figs. 1 and 5). The shaft 191' also has a lever 192 thereon which is arranged to control a brake drum 193' rigid with a gear 232 to be presently described. The gear 232 is free on the shaft 26. Upon the gear 232 adjacent the brake drum 193' is another brake drum 193ª which has a brake band 193ᵇ thereon. One end of this brake band 193ᵇ is secured to a spring 193ᶜ while the other end thereof is secured to a link 193ᵈ which is connected to a lever 193ᵉ fixed on the shaft 191'. The arrangement is such that when the shaft 191' is rocked anti-clockwise the step control 185 will be released and at the same time the brake 193 will be released and the brake 193ª will be applied but this latter brake can operate against the tension of the spring 193ᶜ.

In order to rock the shaft 191' and release the shafts 26 and 106 when the gates 70 are open, I arrange a rock lever 194 which is pivoted at 195 to the frame and which is adapted to be rocked by a cam 196 arranged on the left hand cam 105 previously described. The operation is such (see Fig. 5) that when the shaft 106 drives the cam 105 the cam 196 will rotate thus rocking the lever 194 which is connected by a link 194' with a lever 194ᵇ secured upon the shaft 191'. The notches 186 are so spaced and the cam 196 is so timed that a half revolution of the shaft 106 and consequently a half revolution of the drum, will be accomplished during each period of activity.

When the stack of boxes has been formed and when the elevator moves to its lowest position, a projection 196ª on the elevator will engage a lever 196' secured on a shaft 197 and will rock this shaft. The rocking of the shaft 197 will rock a lever 197' mounted thereon and this lever 197' through a link 198 will rock a lever 198' mounted freely to turn on the shaft 191'. The lever 198' has an offset arm 198ᵇ (see Fig. 1) thereon which engages the lever 194ᵇ so that when the lever 198' is rocked anti-clockwise it will rock the lever 194ᵇ and thus rock the shaft 191'. It will thus be seen that when the elevator reaches the bottom of its movement that the step control 185 and brake 193 will be freed to allow movement of the shafts 26 and 106.

When the lever 198' is rocked it will actuate a link 200 secured upon it thus pulling down one end of a lever 201. The lever 201 is pivoted at 201' and when the end 203 has been pulled down a gravity lock 204 will fall to hold the lever depressed thus holding the step control 185 off and holding the brake 193' released. The lock 204 has a roller 205 which engages the lever 201 and is also provided with a trip bar 206 which when the elevator reverses its position and ascends will be engaged by a block 207 on the elevator to release the lock 204.

When the end 203 of the lever 201 is pulled down the other end moves up and pushes up a locking bar 208 which projects itself into the path to the gates and prevents boxes being fed while the elevator is delivering its load or is ascending.

In order to convey the stack of boxes from the elevator, I provide a pair of chains 210 which pass over sprockets 211 and 212. These chains are spaced apart a distance greater than the length of the elevator platform 131 but less than the length of the boxes so that when the elevator moves downwardly, it will move between these chains and will deposit the boxes which are upon the elevator 131 onto the chains 210.

The sprocket 211 is mounted on a shaft 213 upon which a worm wheel 214 is mounted and this is driven by a worm 214'. The worm 214' is mounted on a shaft 215 which is driven by a bevel gear 216 from a second bevel gear 217 arranged on the shaft 29. The shaft 29 is in continuous rotation so that as soon as the boxes are deposited on the chains 210 they are carried along by these chains to the left in Fig. 2.

As soon as the boxes clear the elevator platform 131 the front edge of the box will strike an arm 220 and will rock this arm on a shaft 221 thus moving a link 222 in the direction of the arrow in Fig. 6. This rocks a bell crank 227 and pulls the link 228 to rock the operating rod 229 which is pivotally mounted to rock on a shaft 230 (see Fig. 1). The operating lever 229 is mounted on one member of a clutch 231 which clutch is slidable on the shaft 26. The clutch 231 when thrown in, clutches the spur gear 232 previously mentioned to the shaft 26. This spur gear 232 meshes with another gear 233 which is keyed by means of a key 234 on the sleeve 137 previously described.

From the foregoing description it will be apparent that when a box carried on the chains 210 strikes the lever 220 this lever, through the bell cranks and links mentioned, will rock the operating member 229 and thus drive in the clutch 231, and thus drawing in the gear to drive the gear 233, and thereby rotating the sleeve 137 and turning the drum 135 in the direction opposite to the direction in which the drum is driven by the shaft 106, through the bevel gear 160. This action will cause the cable 133 to be wound up, thus lifting the elevator. When the elevator reaches its upper position a pin 240 thereon will strike the operating rod 229 and throw out the clutch 231.

Just before the boxes on the chains 210 pass beyond the lever 220 they strike a lever 241 thus rocking it on the shaft 242 and throwing in a clutch 243 on the shaft 215 thus driving a worm wheel 244 which rotates a worm 245 mounted on a shaft 246. The shaft 246 has sprockets 247 thereon to receive chains 248 which pass over other sprockets 249. The chains 248 thus convey the boxes after they leave the chains 210 to thereby form a series of stacks.

Having thus described my invention, I claim:

1. In a box stacking machine, an elevator, a box delivery mechanism for delivering boxes to the elevator, means to lower said elevator, said means comprising a cable, a cable drum on which said cable is wound, a sleeve on which said cable drum is mounted, a shaft within said sleeve, means to drive said sleeve in one direction to rotate said drum and means whereby the positioning of a box on the delivery mechanism actuates the sleeve driving means.

2. In an elevator, a supporting frame, a platform movable thereon, a pair of gates arranged above said platform, means to move said gates apart to deposit a box held on said gates upon said platform, means to convey a box to said gates and means operable when a box is positioned upon said gates to stop said conveying means and to operate said gate moving means, said gate moving means comprising levers pivoted to the elevator frame and engaging the ends of the gates, a link pivoted to each lever, there being a pair of said links adjacent each end of the gates, a block to which said links are pivoted and an operating member for moving said block.

3. In an elevator, a supporting frame, a platform movable thereon, a pair of gates arranged above said platform, means to move said gates apart, said gate moving means comprising levers pivoted to the elevator frame and engaging the ends of the gates, a link pivoted to each lever, there being a pair of said links adjacent each end of the gates, a block to which said links are pivoted, an operating member slidable on said block and an engaging member on said operating member normally engaging said block on one side.

4. In an elevator, a supporting frame, a platform movable thereon, a pair of gates arranged above said platform, means to move said gates apart, to deposit a box held on said gates, upon said platform, said gate moving means comprising pivoted levers engaging said gates, a link pivoted to each lever, a block to which said links are pivoted, an operating member slidable along said block, a locking nut on said operating member normally engaging said block on one side, a spring on the other side of said block, a collar for engaging said spring and means to move said operating member to separate said gates.

5. In an elevator, a supporting frame, a platform movable thereon, a pair of gates arranged above said platform and means to move said gates apart to deposit a box held on said gates, upon said platform, an operating member for the gate moving means and a resilient connection between said operating member and the gate moving means to prevent breakage of a box caught between said gates.

6. In an elevator, a supporting frame, a platform movable thereon, a pair of gates arranged above said platform, means to move said gates apart, said means comprising an operating member and means to move said operating member to operate said gates, said means comprising a pivoted lever, connected to the operating member, a rotating shaft, a cam on said shaft, and means whereby said cam operates said lever.

7. In an elevator, a supporting frame, a platform movable thereon, a cable for moving the platform, a drum for the cable, a support for the drum, a pair of gates arranged above said platform and means to move said gates apart, said means including an operating member and means actuated by said cable drum support for moving said operating member.

8. In an elevator, a supporting frame, a platform movable thereon, a cable for moving the platform, a drum for the cable, a support for the drum, a pair of gates arranged above said platform, means to move said gates apart, said means including an operating member, a rotating shaft, a cam on said shaft and means whereby said cam actuates said operating member and said shaft actuates said drum.

9. In an elevator, a supporting frame, a platform movable thereon, a cable for moving the platform, a drum for the cable, a support for the drum, a pair of gates arranged above said platform, means to move said gates apart, said means comprising a pivoted lever, an operating member for said lever, and means to move said operating member to operate said gates, said means including a rotating shaft having a cam thereon for moving said member, means to drive said cam including a clutch and means whereby when a box is positioned on the said gates said clutch will be thrown in.

10. In an elevator, a supporting frame, a platform movable thereon, a pair of gates arranged above said platform, means to move said gates apart, said means including an aperating member, means to move said operating member to operate said gates, said means including a rotating shaft, means on said shaft for actuating the operating member, said means including a clutch and means whereby when a box is positioned upon the said gates, said clutch will be thrown in, a cable drum on said shaft, a cable connecting said drum to said elevator, and means whereby said cable is unwound from said drum when said clutch is thrown in, and means acting when said elevator reaches its lowermost position to reverse the direction of the operation of said cable drum to move the elevator to starting position.

11. In an elevator, a supporting frame, a platform movable thereon, a pair of gates arranged above said platform, means to move said gates apart to deposit a box held on said gates upon said platform, means to move said box to said gates and means operable when a box is positioned upon said gates to stop said feeding means and to actuate said gate separating means, said means comprising levers pivoted to the elevator frame and engaging the ends of the gates, a link pivoted to each lever, there being a pair of said links adjacent each end of the gates, a block to which said links are pivoted, an operating member slidable relative to said block, a stop member on said operating member normally engaging said block on one side, a spring on the other side of said block, a collar engaging said spring, means to move said operating member to operate said gates, said last mentioned means comprising a pivoted lever, connected to the operating member, a rotating shaft, a cam on said shaft engaging said pivoted lever, means to drive said cam including a clutch and means whereby when a box is positioned upon the said gates said clutch will be thrown in, a cable drum on said shaft, a cable connecting said drum to said platform, and means whereby said cable is unwound from said drum when said clutch is thrown in and means acting when said platform reaches its lowermost position to reverse the direction of the operation of said cable drum to move the platform to starting position.

12. A mechanism for delivering articles from a horizontal conveyer to the point beneath the conveyer, said mechanism comprising a pair of laterally movable gates, means to deliver articles to said gates while the latter are together, means to prevent delivery of articles to said gates when they are separated, means controlling the movement of said gates, said means comprising an operating member at each end of said gates, a drive shaft, a pair of cams on said drive shafts and means for actuating said operating members from said cams.

13. In a horizontal conveyer, a conveyer line and a delivery mechanism for intermittently delivering articles from said conveyer, said delivery mechanism comprising a pair of spaced rolls for directly engaging the articles to be delivered, a shaft fixed on each of said rolls, a sprocket on each shaft, a chain connecting said sprockets, means to drive said chain, a pulley over which said conveyer line passes and means for intermittently driving said pulley from said first mentioned driving means.

14. In a conveying device, a horizontal conveyer and a delivery mechanism for intermittently delivering articles from said conveyer, said delivery mechanism comprising a pair of spaced rolls, shafts for said rolls, driving means connecting said shafts, means to operate said driving means, a pulley over which said conveyer line passes, means for intermittently driving said pulley from said last mentioned means, said intermittent driving means including a loose belt and a brake, an operating member associated with said delivery mechanism, and means whereby when a box is on said delivery mechanism the conveyer will be stopped.

15. In a conveying device including a horizontal conveyer and a vertical conveyer, means to feed articles from the said horizontal conveyer to said vertical conveyer, said means including a delivery roll for directly engaging articles fed from said horizontal conveyer and for advancing them, a second delivery roll spaced from the first delivery roll, means to direct articles from said second delivery roll to said vertical conveyer and means to drive said rolls.

16. In a conveying device including a horizontal conveyer and a vertical conveyer, means to feed articles from the horizontal conveyer to the vertical conveyer, said means including a delivery roll for advancing articles advanced by said horizontal conveyer, a second delivery roll spaced from the first delivery roll, means to guide articles from said second delivery roll to said vertical conveyer and means to drive said spaced rolls, said driving means including a drive shaft having a pulley thereon, a pulley on one of said feed rolls, a loose belt connecting said pulleys and means for intermittently tightening said belt, said last mentioned means comprising an operating member adapted to be engaged by an article positioned upon the first of said rolls.

17. In a box stacking machine, an elevator frame, an elevator, a pair of gates including a plurality of box receiving rollers, said gates comprising members in which said rollers are fitted, said rollers having bushings thereon and means to hold said rollers on said gates.

18. In a box stacking machine, an elevator frame, an elevator, a pair of gates including a plurality of box receiving rollers, and means to deliver boxes to said rollers, said gates each comprise a pair of spaced members and said rollers comprising a body part having a reduced end thereon, bushings arranged on said reduced ends, said bushings being fitted in apertures in said spaced member, said bushings having a peripheral groove therein and split washers secured in said grooves to hold said bushings in position in said spaced members.

19. In a device of the class described, a pair of horizontal conveyers spaced apart vertically, means to convey boxes from one conveyer to the other conveyer, said lower conveyer comprising a pair of spaced chains, a second pair of spaced chains adjacent said first spaced chains and having the reaches thereof overlapping the reaches of the first mentioned pair of spaced chains, means to drive said chains, the driving means for the second mentioned pair of chains being normally inoperative and means to render said normally inactive means active upon movement of an article to said second spaced chains.

20. In a device of the class described, a pair of horizontal conveyers spaced apart vertically, means to convey boxes from one conveyer to the other conveyer step by step, means to form a stack of articles as they are moved, means to deliver said stack of articles to the lower horizontal conveyer, said last mentioned horizontal conveyer comprising a pair of spaced chains, a second pair of spaced chains having the reaches thereof overlapping the reaches of the first mentioned pair of spaced chains and means to drive said chains.

In testimony whereof, I hereunto affix my signature.

FRANK B. ROBERTS.